No. 657,953. Patented Sept. 18, 1900.
L. McLAREN.
DEVICE FOR TEACHING MUSIC.
(Application filed Dec. 8, 1899.)
(No Model.) 2 Sheets—Sheet 1.

WITNESSES:
John Hoods
Fred L Wharton

INVENTOR
Laura McLaren
BY C.N. Edwards
her ATTORNEY

No. 657,953. Patented Sept. 18, 1900.
L. McLAREN.
DEVICE FOR TEACHING MUSIC.
(Application filed Dec. 8, 1899.)
(No Model.) 2 Sheets—Sheet 2.

WITNESSES:
John Woods
Fred L Whitney

INVENTOR
Laura McLaren
BY C W Edwards
her ATTORNEY

UNITED STATES PATENT OFFICE.

LAURA McLAREN, OF OTTAWA, CANADA.

DEVICE FOR TEACHING MUSIC.

SPECIFICATION forming part of Letters Patent No. 657,953, dated September 18, 1900.

Application filed December 8, 1899. Serial No. 739,663. (No model.)

*To all whom it may concern:*

Be it known that I, LAURA McLAREN, a subject of the Queen of Great Britain, residing at Ottawa, in the Province of Ontario, Dominion of Canada, have invented certain new and useful Improvements in Devices for Teaching Music, of which the following is a full, clear, and exact specification.

This invention relates to devices for teaching music; and its object is to construct a simple device which shall be of assistance to the teacher in illustrating the principles of music.

In teaching music it is often desirable that the teacher shall be able to represent to the mind of the pupil a visual embodiment of the construction of the various scales and to refer to some structure in which the various tones and half-tones are representing physical objects separating other objects representing sounds and these objects arranged together to form the various scales. According to my invention I propose to provide a suitable holder and a suitable number of objects to represent the various tones and notes or sounds, these objects being adapted to be arranged in the holder to suitably represent the various scales.

The invention will be more particularly described hereinafter with reference to the forms thereof shown in the accompanying drawings, in which—

Figure 1:
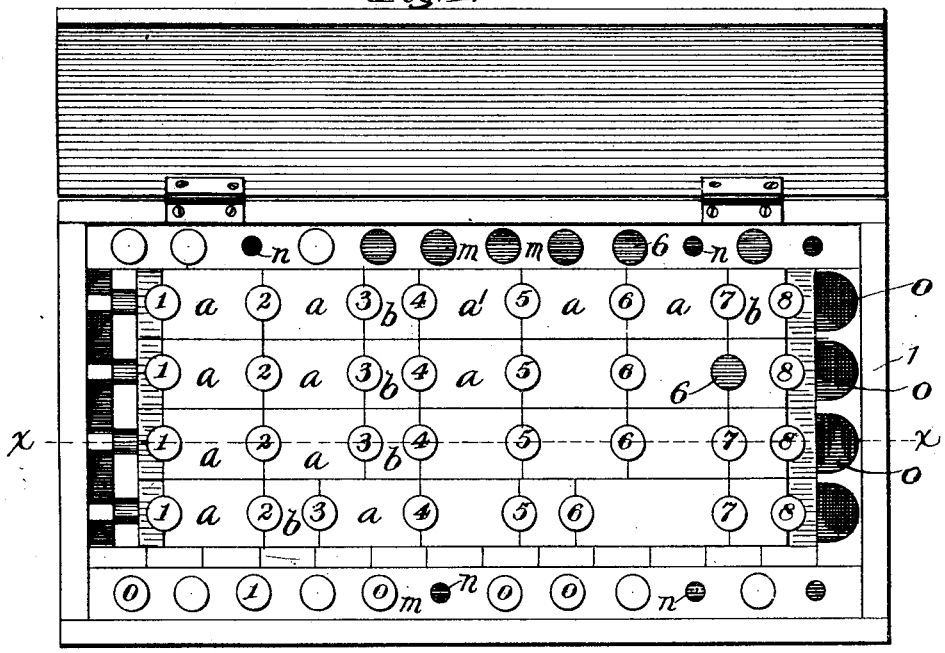
Figure 2:
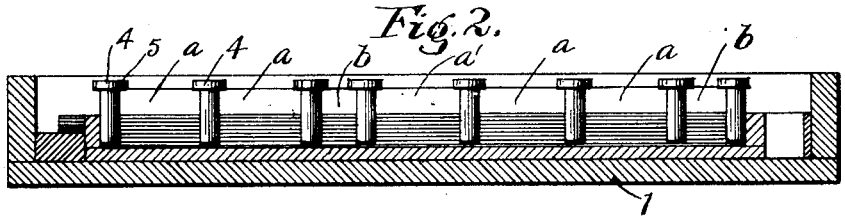
Figure 3:
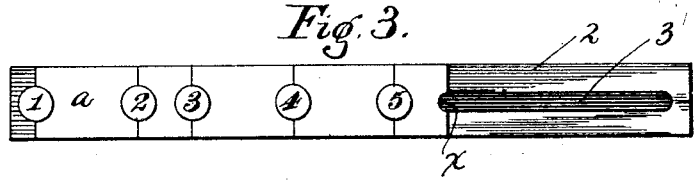
Figure 4:
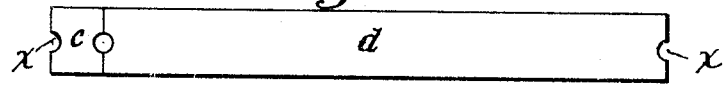
Figure 5:
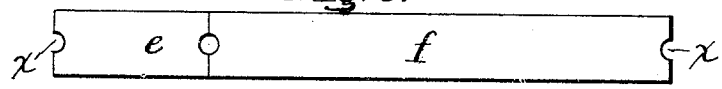
Figure 6:
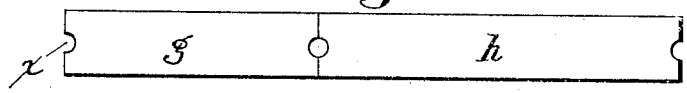
Figure 7:
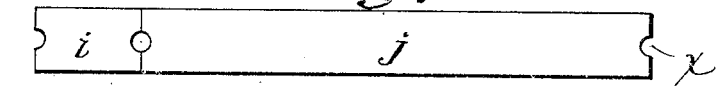
Figure 8:
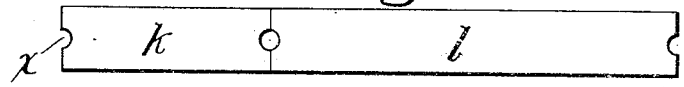

Figure 1 is a plan view of a suitable box containing a number of holders, in which are arranged blocks and pegs representing tones and sounds. Fig. 2 is a sectional view taken on the line $x\ x$ in Fig. 1 and illustrating the manner in which the blocks and pegs are arranged in the holder. Fig. 3 is a top view of one of the holders having some of the blocks and pegs removed, and Figs. 4 to 8, inclusive, are blocks adapted to be used in connection with the holders for teaching intervals and inversions.

Referring more particularly to the drawings, 1 represents a suitable box or casing which may be used, if desired, to contain the various objects above mentioned. A suitable holder 2 is provided with a longitudinal slot 3, extending to within a short distance of each end of the holder.

4 4 4 represent suitable pegs, the ends of which are adapted to fit the longitudinal slot 3 and having suitable heads 5, upon which may be marked figures from "1" to "8," as illustrated in the drawings, to represent the various tones of the scales. If preferred, the heads of the pegs may be colored or roughened, as indicated at 6 in the drawings, to represent raised or lowered sounds—*i. e.*, sharps or flats.

$a\ a\ b\ b$, &c., are blocks representing intervals of pitch distances, the blocks $a$ representing the distance of whole tones and the blocks $b$ representing half-tones. These blocks are provided with recesses $x$ at each end thereof, adapted to surround the pegs 4.

In applying the device in practice the blocks and pegs are removed from the holders and the pupil is taught that each block represents pitch distance, the long blocks $a$ representing the distance of a whole note and the smaller blocks $b$ representing the distance of a half-note, and that each scale is made up of a certain number of sounds, represented on the device by pegs separated by a certain number of tones and half-tones, represented in the device by blocks. Therefore in building up the major scales the blocks and pegs will be arranged in the order shown in Fig. 2, in which the half-tones occur between the third and fourth and seventh and eighth sounds. In building up the minor scales the blocks will be arranged in the order illustrated in the lowest row of blocks in Fig. 1—that is, the half-tones occurring between "2 and 3," "5 and 6," "7 and 8."

The construction of the scales may be impressed upon the mind of the pupil in various ways by the aid of the blocks. I have found that the forms of the scales are remembered well if the pupil is taught that each major scale is composed of two similarly-built groups of four sounds, the four sounds being separated by two tones and one semitone and these two groups separated by a tone. Thus the scale illustrated in Fig. 2 is composed of two groups of four notes, each separated by the tone $a'$.

If preferred, certain of the pegs may have the upper face thereof colored or roughened to indicate raised and lowered sounds—*i. e.*, sharps and flats. This will be found of use in illustrating the building up of the chromatic scales.

In teaching intervals and their inversions it is often difficult to explain why an octave is made up of a second and a seventh, for instance, when, as a matter of fact, there are only eight sounds in the scale. This difficulty disappears, however, when the pupil is taught that distance is represented by one block and the sounds by two pegs at the ends of the block. In teaching the intervals and inversions the blocks may be made the proper lengths to indicate the various intervals and their inversions. Thus in Fig. 4, c represents the minor second, and d the major seventh; in Fig. 5, e represents the minor third, and f the major sixth; in Fig. 6, g represents the perfect fourth, and h the perfect fifth; in Fig. 7, i represents the major second, and j the minor seventh; and in Fig. 8, k represents the major third, and l the minor sixth. These blocks may be built up on holders in the manner hereinbefore described.

It is obvious that the blocks and the pegs may be varied in numerous ways and constructed in numerous ways to represent the various scales.

For convenience in carrying the devices around I have devised the containing-box shown in the drawings, in which the racks m are provided at each side, the racks containing holes n, adapted to receive the pegs. Suitable recesses o are provided at the end of the box to enable the holders to be easily removed from the box.

Having thus described my invention, I declare that what I claim is new, and desire to secure by Letters Patent, is—

1. The combination of a holder, a plurality of pegs, representing sounds, adapted to be supported in said holder, and a plurality of blocks, representing intervals of pitch distances, adapted to be interposed between said pegs, substantially as described.

2. The combination of a holder having a longitudinal slot therein, a plurality of pegs, representing notes, adapted to fit into said slot, and a plurality of blocks, representing intervals of pitch distances, adapted to be interposed between said pegs, substantially as described.

3. A combination of a holder, a plurality of pegs having flat surfaces, bearing inscriptions representing sounds, said pegs being adapted to be supported in said holder, and a plurality of blocks representing intervals of pitch distances, adapted to be interposed between said pegs, substantially as described.

4. A combination of a holder having a longitudinal slot therein, a plurality of pegs representing notes, said pegs being adapted to fit into said slot, and a plurality of blocks representing intervals of pitch distances, said blocks each having a recess at the end thereof, adapted to surround said pegs, substantially as described.

5. A combination of a holder, a plurality of pegs representing sounds, adapted to rest therein, and a plurality of blocks representing intervals of pitch distances, adapted to be interposed between said pegs, one or more of said pegs, or parts thereof, being colored or otherwise distinguished from the rest of the said pegs, substantially as described.

In testimony whereof I affix my signature in presence of two witnesses.

LAURA McLAREN.

Witnesses:
  A. W. G. McDANIEL,
  PETER J. DUNNE.